(12) United States Patent
Wakefield

(10) Patent No.: US 10,617,105 B2
(45) Date of Patent: Apr. 14, 2020

(54) MECHANICAL FISHING PLANER BOARD AND METHOD

(71) Applicant: Raw-Tek Innovations, LLC, Sheboygan Falls, WI (US)

(72) Inventor: Rick Wakefield, Sheboygan Falls, WI (US)

(73) Assignee: Raw-Tek Innovations, LLC, Sheboygan Falls, WI (US)

( * ) Notice: Subject to any disclaimer, the term of this patent is extended or adjusted under 35 U.S.C. 154(b) by 275 days.

(21) Appl. No.: 15/365,521

(22) Filed: Nov. 30, 2016

(65) Prior Publication Data

US 2017/0150707 A1    Jun. 1, 2017

Related U.S. Application Data

(60) Provisional application No. 62/261,097, filed on Nov. 30, 2015.

(51) Int. Cl.
*A01K 91/08*    (2006.01)
(52) U.S. Cl.
CPC ................................. *A01K 91/08* (2013.01)

(58) Field of Classification Search
CPC .......... A01K 91/08; A01K 91/06; A01K 91/18
See application file for complete search history.

(56) References Cited

U.S. PATENT DOCUMENTS

| | | |
|---|---|---|
| D330,752 S | 11/1992 | Spickelmire |
| 5,826,365 A | 10/1998 | Stroobants |
| 6,119,389 A * | 9/2000 | Walker .................. A01K 97/125 43/17 |
| 6,789,350 B1 | 9/2004 | Link |
| 7,578,092 B2 | 8/2009 | Spickelmire |
| 7,644,534 B2 | 1/2010 | Hagen et al. |
| 2008/0172925 A1 | 7/2008 | Hazel |

* cited by examiner

*Primary Examiner* — Jessica B Wong
(74) *Attorney, Agent, or Firm* — Ziolkowski Patent Solutions Group, SC

(57) ABSTRACT

A mechanical planer board that is arranged for use on both the right and left sides of a towing boat and is further adapted to move from a boat side position to a boat rear position upon a fish strike. The planer board includes a body having a housing, a float, an internal assembly, and at least one line clip having a tow arm. The tow arm maintains the line clip in towing configuration until a fish strike pulls a trigger pin to release the tow arm thereby allowing it to swing and lock in a forward position. The board may further include an indicator device to alert the fisher of board location.

5 Claims, 10 Drawing Sheets

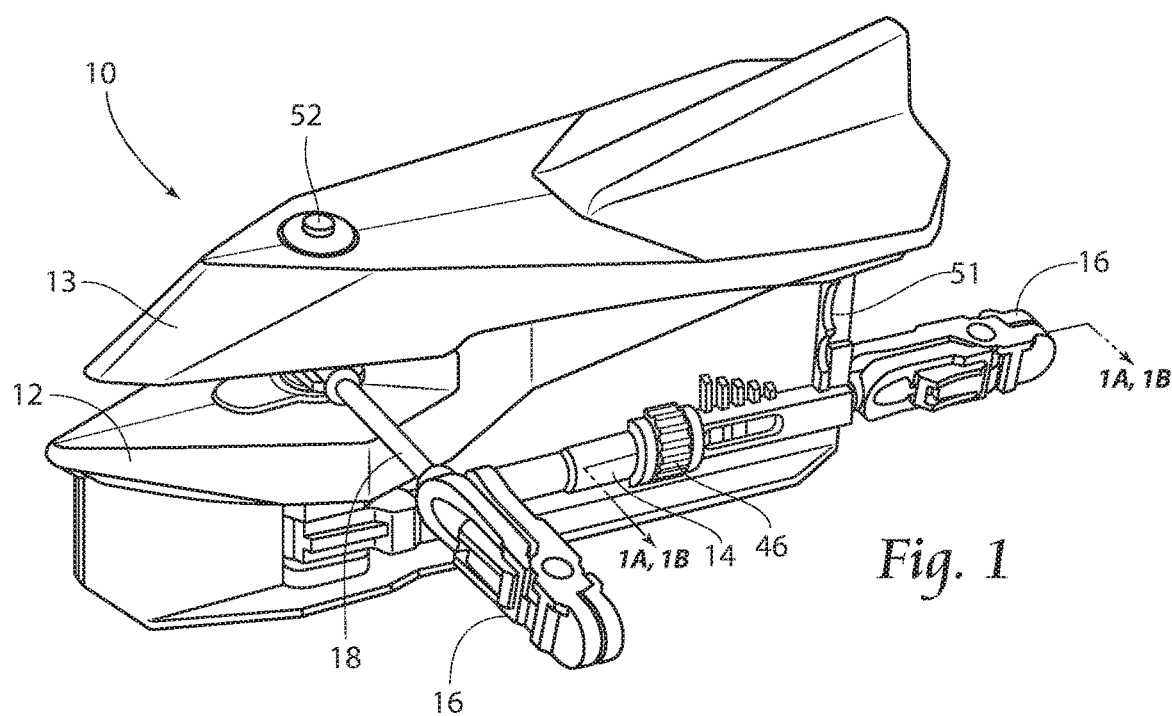
Fig. 1
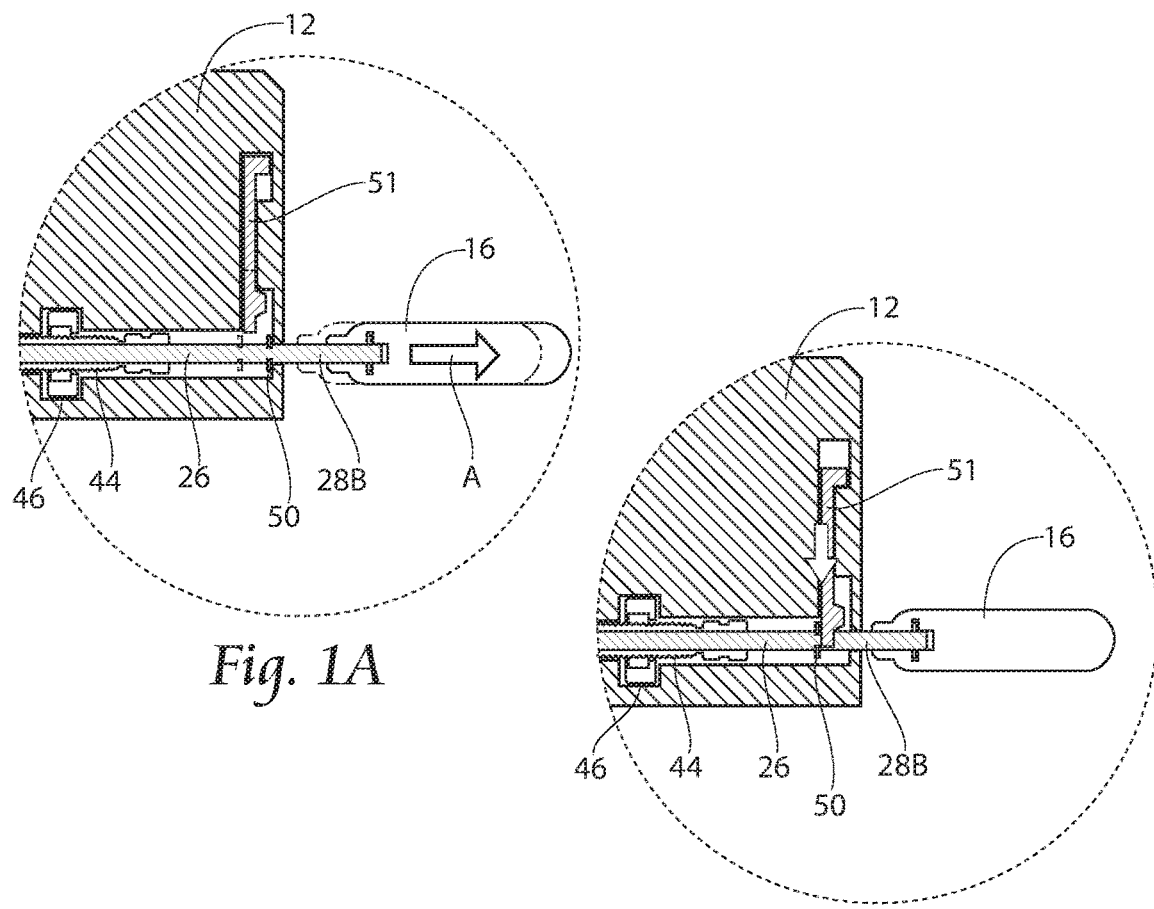
Fig. 1A
Fig. 1B

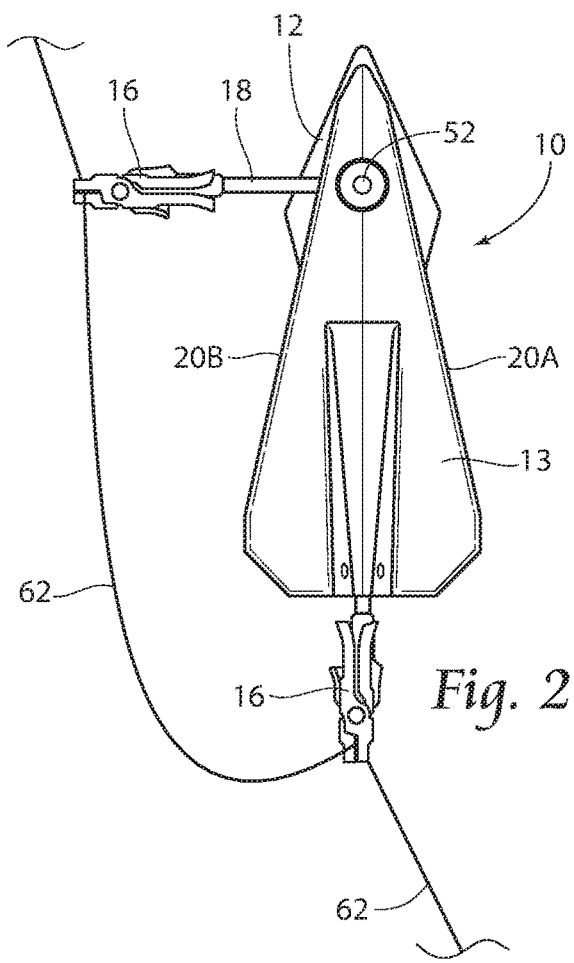
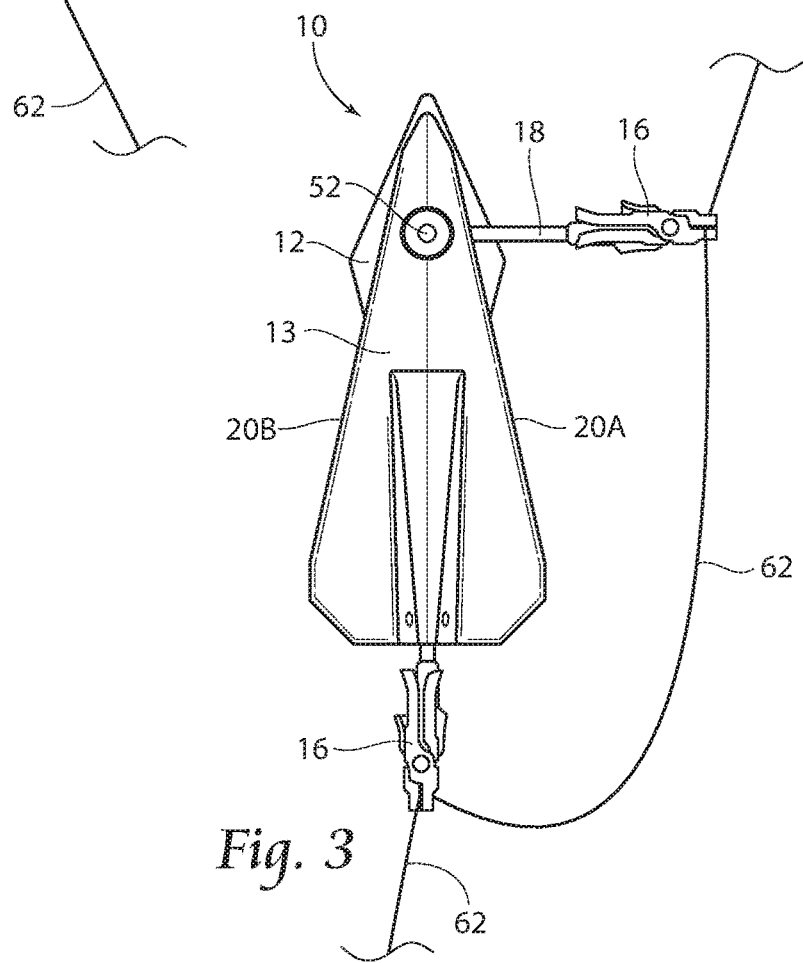
Fig. 2
Fig. 3

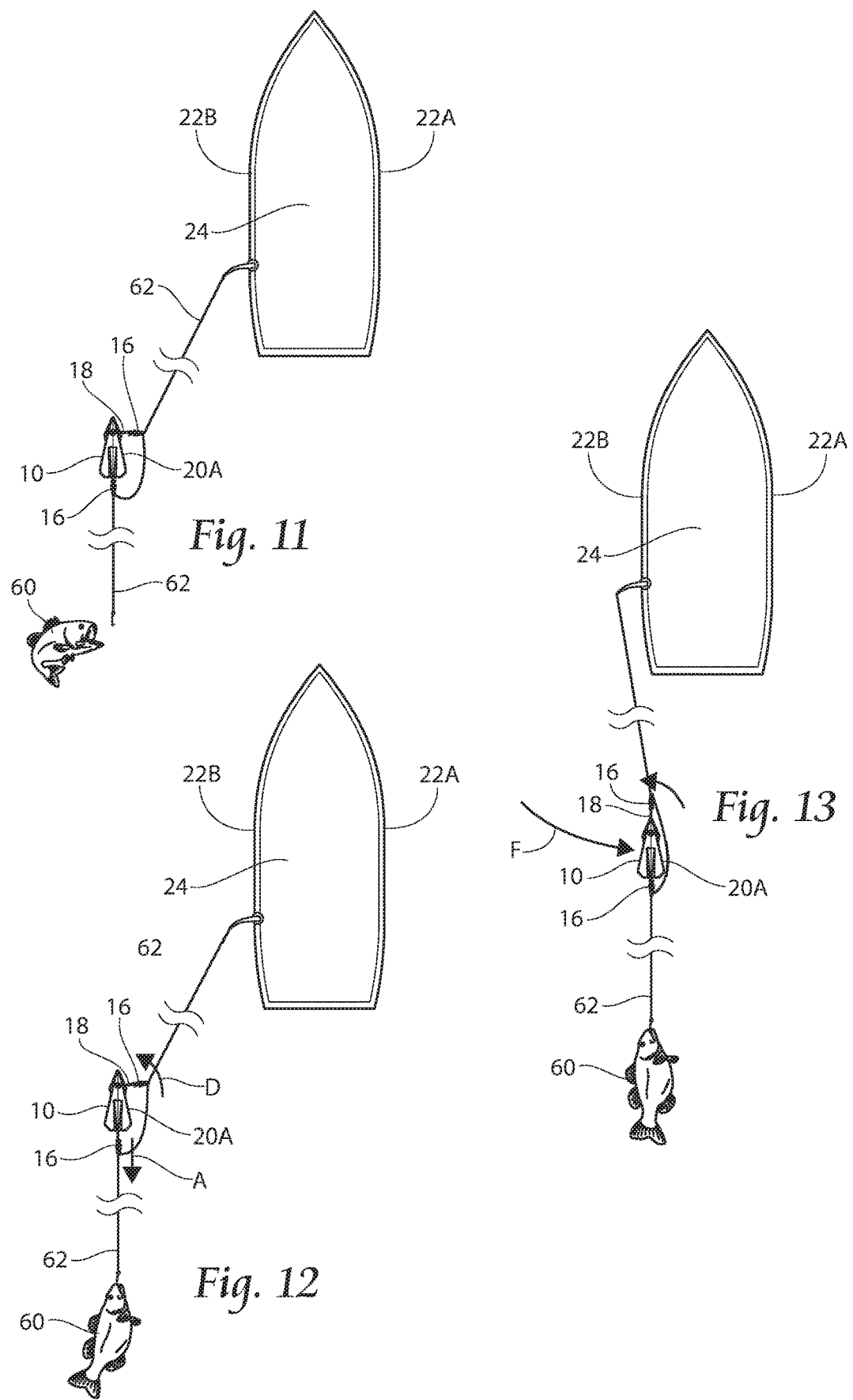

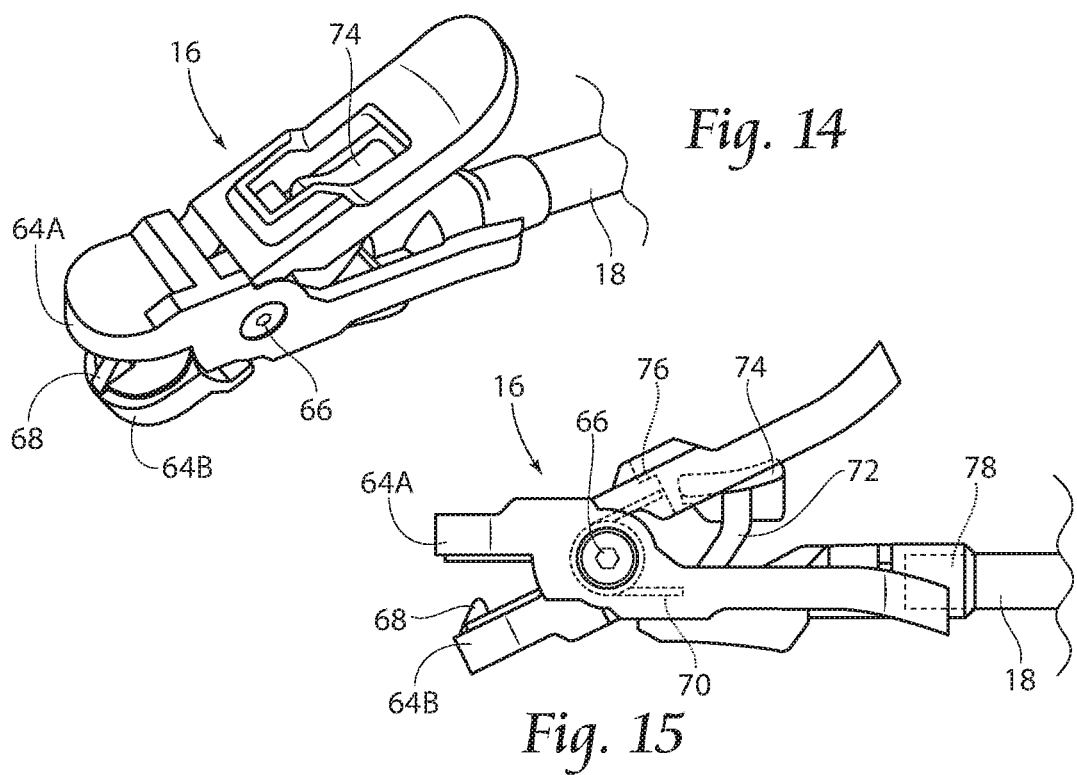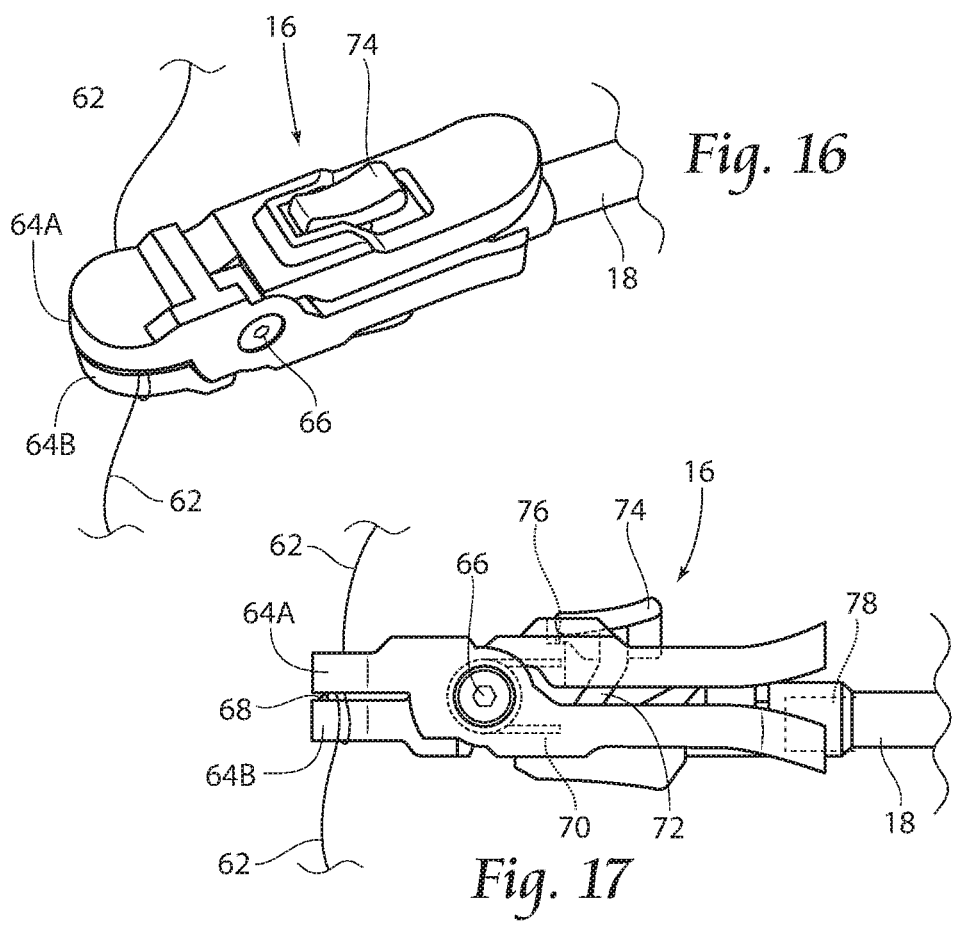

MECHANICAL FISHING PLANER BOARD AND METHOD

RELATED APPLICATIONS

This application claims the benefit of U.S. Provisional Patent Application Ser. No. 62/261,097, entitled, "Mechanical Planer Board," and filed on 30 Nov. 2015.

BACKGROUND OF THE INVENTION

The present invention pertains to fishing equipment, and particularly to an apparatus used while trolling multiple fishing lines from a fishing boat.

When fishing lines are used behind a boat during trolling, the lines have a tendency to move to a path of least resistance, typically directly behind the moving boat. When use of multiple lines is desired, this tendency may create difficulties due to entanglement of the lines drifting together behind the boat. Planer boards are typically used to enable baits to be pulled through the water at locations away from the side of the boat. Planer boards operate to help guide fishing lines laterally outward from the boat, to allow the fisher to utilize more than one line, and to reduce the chance of line entanglement. A fisher may employ several planer boards on either side of the boat and at various distances from the boat to maximize the area being fished.

Generally, a fishing line attaches to a planer board at two points. The board pivots about a forward, tow point as the water moves against the board to maintain an angular orientation relative to the water and guides the line away from the boat to help prevent entanglement with other lines. A rearward strike point attaches to a baited fishing line.

Prior art planer boards may have several problems. First, they are often difficult to use, particularly after hooking a fish. The user must reel in the line, the board, and the hooked fish all while the board continues to move across the water surface angularly to the direction of the boat. This is cumbersome and the user is hindered in quickly removing the board from the line to reel in the fish. This may cause lost fish. Moreover, typical boards are configured to be usable on one or the other side of a boat, and are not interchangeably usable. This forces the fisher to purchase multiple boards, each having practical use on only one side of the boat. This can be costly and is inefficient.

SUMMARY OF THE INVENTION

The present invention is directed to a mechanical planer board that is sturdy and easy to use. The board is adapted for use on both the right and left sides of a towing boat and is further adapted to move from a boat side position to a boat rear position upon a fish strike.

The planer board includes a body having a housing and a float which are symmetrical about their length, an internal assembly, and at least one line clip having a tow arm. The tow arm maintains the line clip in towing configuration until a fish strike pulls a trigger pin to release the tow arm thereby allowing it to swing and lock in a forward position. With the tow arm in the forward position, the board moves from a position flanking the tow boat to a position behind the boat to allow the user to easily retrieve the board and attached fish. The board may further include an indicator device to inform users of the board location or notify nearby boaters of the presence of the device.

BRIEF DESCRIPTION OF THE DRAWINGS

FIG. 1 is a perspective, partial cut away view of a planer board according to the present invention.

FIG. 1A is a cross sectional view of FIG. 1, taken along lines 1A-1A thereof, and showing the locking mechanism in retracted position.

FIG. 1B is a cross sectional view of FIG. 1, taken along lines 1B-1B thereof, and showing the locking mechanism in locked position.

FIG. 2 is a top plan view of the planer board illustrated in FIG. 1 and showing a tow arm and attached fishing line in a left side orientation.

FIG. 3 is a top plan view of the planer board similar to that of FIG. 2, but showing a tow arm and attached fishing line in a right side orientation.

FIGS. 11-13 are schematic views, similar to that of FIGS. 8-10 and showing the planer board in operation on the port side of a boat.

FIG. 14 is a perspective view of a line clip for use with the present invention, and showing the clip in the open position.

FIG. 15 is a side view of the line clip illustrated in FIG. 14.

FIG. 16 is a perspective view of the line clip illustrated in FIGS. 14 and 15, and showing the clip in the closed position.

FIG. 17 is a side view of the line clip illustrated in FIG. 16.

DETAILED DESCRIPTION

Figure 4:
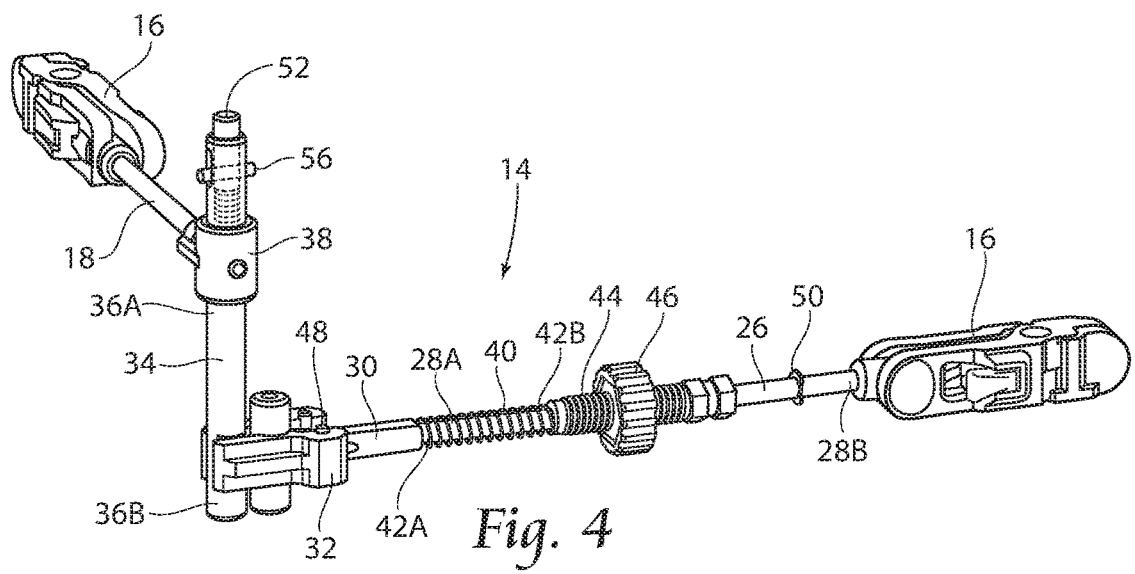
FIG. 4 is a perspective view of the internal assembly of the planer board illustrated in FIGS. 1-3, with the housing removed and showing a tow arm in set position in a right side orientation.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

A planer board 10 according to the present invention may be seen in the view of FIG. 1. As shown, the board 10 includes a housing 12, a float member 13, an internal assembly 14, and at least one line clip 16. As is further seen in FIGS. 2 and 3, a line clip 16 is supported on a tow arm 18 and is adapted to be positioned on either the right or the left side 20A, 20B, respectively, of the board 10. This feature provides flexibility of use since a single board 10 may be towed on either the starboard 22A or port side 22B of a boat 24 (see FIGS. 8-13), depending on the position of the tow arm 18, as will be discussed.

Figure 5:
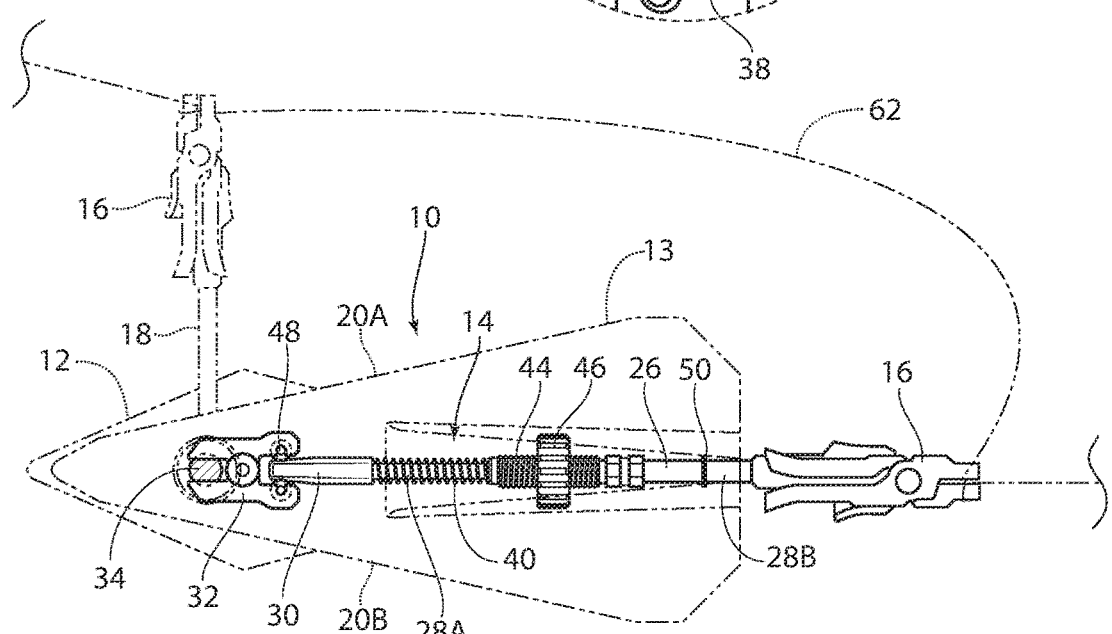
FIG. 5 is a top plan view of the internal assembly illustrating a tow arm in set position in a right side orientation, and showing the housing in phantom.
Figure 6:
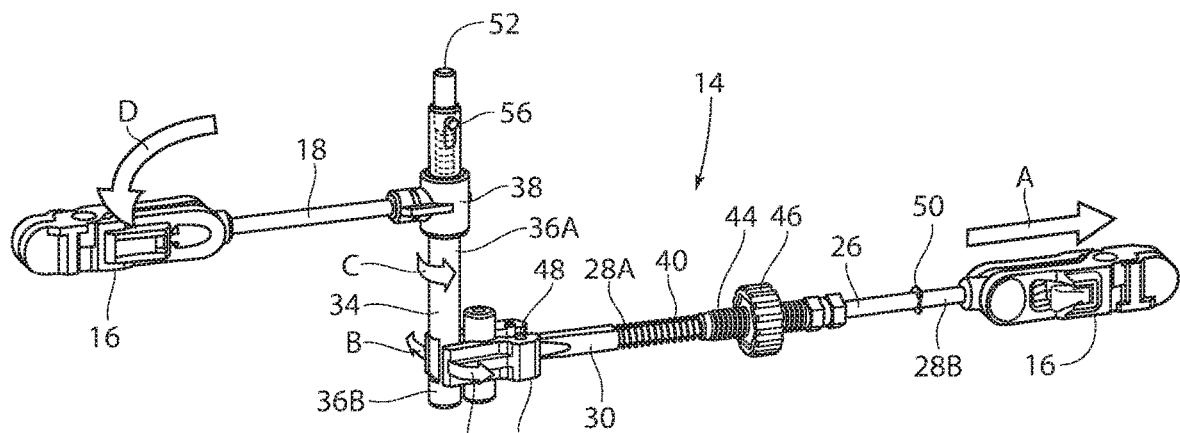
FIG. 6 is a view similar to that of FIG. 4, but showing a tow arm in forward, tripped position.

With attention to the views of FIGS. 4 and 6, the internal assembly 14 and attached clips 16 may be seen. As shown, the internal assembly 14 includes a trigger pin 26 having a pin first end 28A and a pin second end 28B, a tapered pin 30, and scissoring jaws 32. A tow arm pivot rod 34 having a first rod end 36A and a second rod end 36B is supported at its second end 36B by scissoring jaws 32. A tow arm 18 is pivotally attached to the first rod end 36A of the tow arm pivot rod 34 by way of a tow arm collar 38. In towing position, and as shown in FIG. 4, the scissoring jaws 32 clamp the second end 36B of the tow arm pivot rod 34 in tow position and prevent it, the tow arm 18, and the attached tow line clip 16 from rotation. The first end 28A of the trigger pin 26 supports a tensioning spring 40 therearound. A first end 42A of the tensioning spring 40 abuts the tapered pin 30, and a second end 42B abuts a threaded sleeve 44. The threaded sleeve 44 provides variable set tension on the tensioning spring 40 by way of adjustment of a spring tensioning thumb wheel 46. Tensioning spring 40 biases the tapered pin 30 between rollers 48 set in scissoring jaws 32. When the tapered pin 30 is biased against the rollers 48, as is shown in FIGS. 4 and 5, the jaws 32 are firmly clamped on the tow arm pivot rod 34, thereby preventing rotation thereof and holding the tow arm pivot rod 34 and tow arm 18 in a tow position.

With further attention to FIGS. 4 and 6, a retaining ring 50 may also be provided on the second end 28B of the trigger pin 26. The retaining ring 50 limits travel of the trigger pin 26 in the direction of arrow A (see also FIG. 1A) as the trigger pin 26 exits the housing 12. As shown, when the ring 50 contacts the housing 12 it prevents the trigger pin 26 from further rearward displacement. It may be desirable to limit travel of the trigger pin 26 to thereby reduce excessive travel and over-compression of the trigger pin tensioning spring 40. Moreover, and as viewed in FIGS. 1A and 1B, a locking mechanism 51 may be provided to further prevent travel of the trigger pin 26, if desired. Use of the locking mechanism 51 is viewed particularly in FIG. 1B. As shown, when the locking mechanism 51 is deployed, it keeps the tensioning spring 40 biased, the tapered pin 30 between rollers 48 set in scissoring jaws 32, and the jaws 32 firmly clamped on the tow arm pivot rod 34. In use, the locking mechanism 51 prevents rotation of the tow arm pivot rod 34 during a fish strike or other rearward movement of the strike line clip 16. The locking mechanism 51 may be utilized when for example, a user desires to use the board 10 in a conventional, non-trip manner, or if the user wishes to reduce false strikes while dragging a bait in snag prone areas (not shown).

Figure 4A:
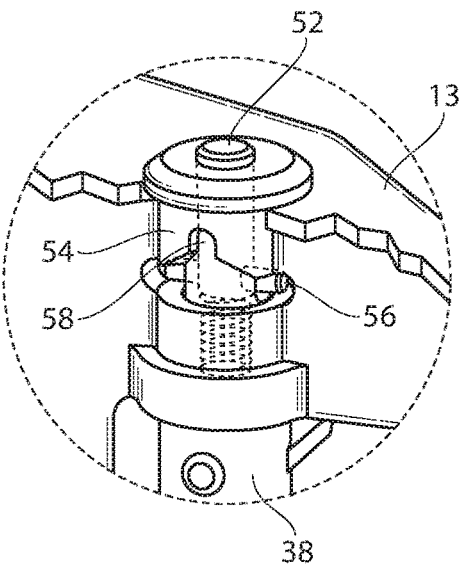
FIG. 4A is an enlarged, partially cut away view showing the trip pin in the depressed condition.

Manipulation of the tow arm 18 from one or the other side 20A, 20B of the device 10 may be accomplished by way of a spring loaded push button 52. As is illustrated in FIGS. 4 and 4A, a spring loaded push button 52 is retained in a button housing 54 within the main housing 12. The push button 52 includes a transverse pin member 56 which is adapted for engagement in a pin slot 58 in the button housing 54. When positioning of the tow arm 18 to one or the other side 20A, 20B of the board 10 is desired, the button 52 is manually depressed, the pin member 56 is lowered from the pin slot 58, and the tow arm is manually rotated to the desired side 20A, 20B of the board 10. The pin 56 is engaged in the pin slot 58 after a fish strike, as will be discussed.

Figure 6A:
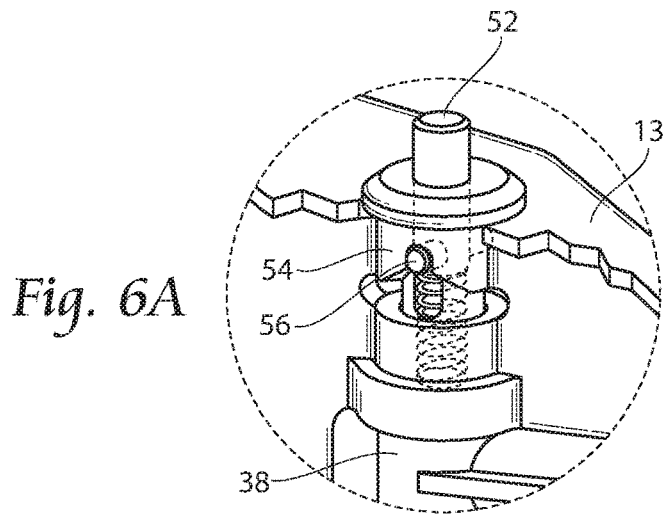
FIG. 6A is a view similar to that of FIG. 4A but showing the trip pin in tripped condition.
Figure 7:
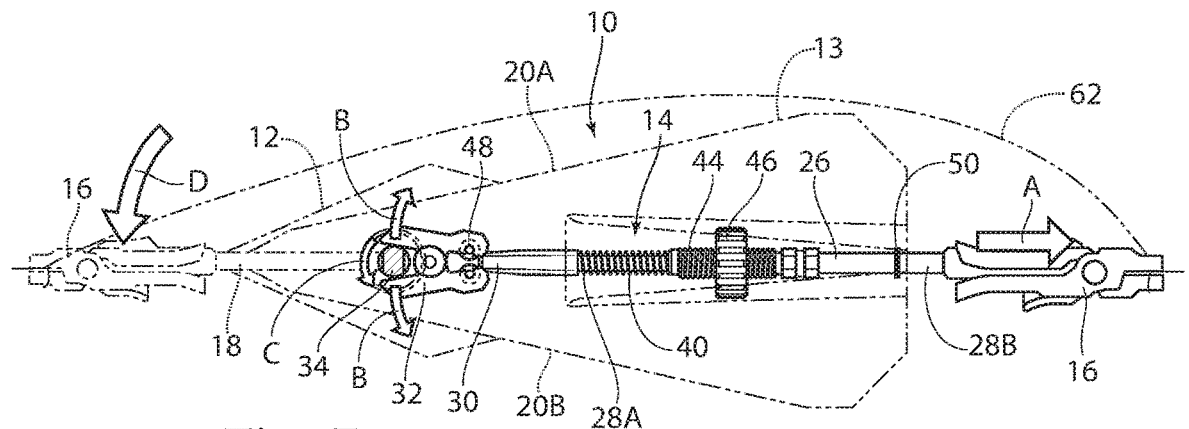
FIG. 7 is a view similar to that of FIG. 5 but showing a tow arm in forward, tripped position.

With attention to FIGS. 4 and 6, it may be seen that a strike line clip 16 is mounted on the second end 28B of the trigger pin 26. When a fish 60 (see FIGS. 8-13) strikes, the strike line clip 16 is pulled in the direction of arrow A (see FIG. 6) and the movement overcomes the bias of the tensioning spring 40 against the tapered pin 30. Continued movement in the direction of arrow A, pulls the tapered pin 30 from between the rollers 48 and the scissoring jaws 32 open in the direction of arrow B thereby allowing the tow arm pivot rod 34 to rotate in the direction of arrows C (see FIGS. 6 and 7) and the tow line clip 16 to move from the tow position illustrated in FIG. 4, in the direction of arrows D (see FIG. 6), to the tripped position shown in FIG. 6. With reference to FIG. 6A, it may be seen that after a fish strike and rotation of the tow arm 18 to a tripped position, the push button 52 and a pin member 56 snap into the pin slot 58 further maintaining the tow arm 18 in tripped position. When the tow arm 18 is in tripped position, as is shown in FIGS. 6-7, the button 52 and pin 56 are elevated with the pin 56 retained in the pin slot 58.

Figure 8:
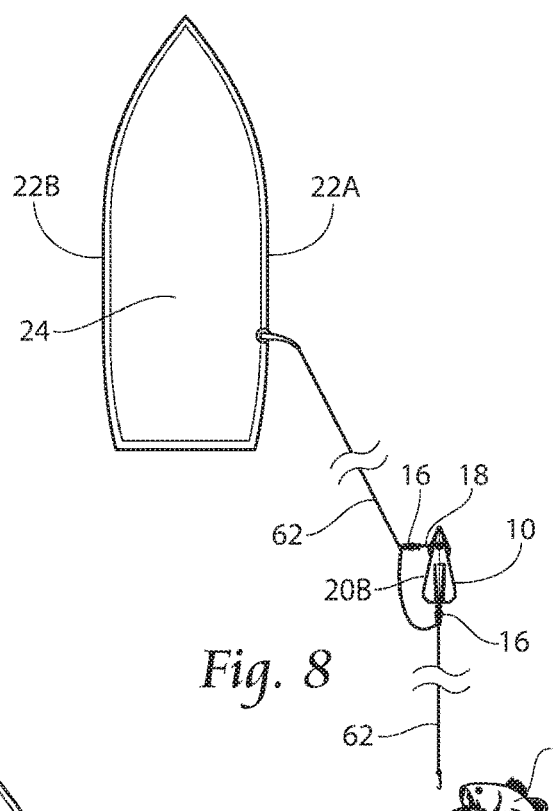
FIGS. 8-10 are schematic top plan views showing the planer board illustrated in FIG. 1 in operation.
Figure 9:
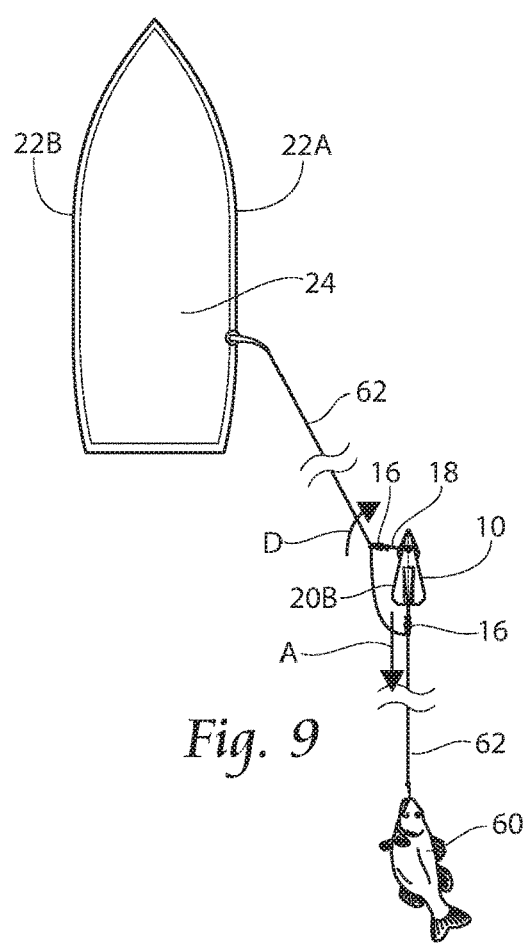
Figure 10:
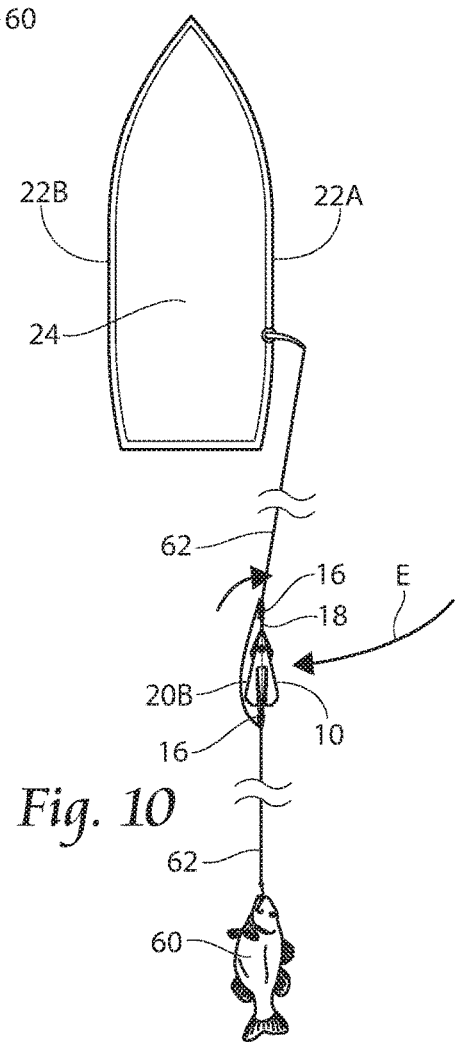
Figure 18:
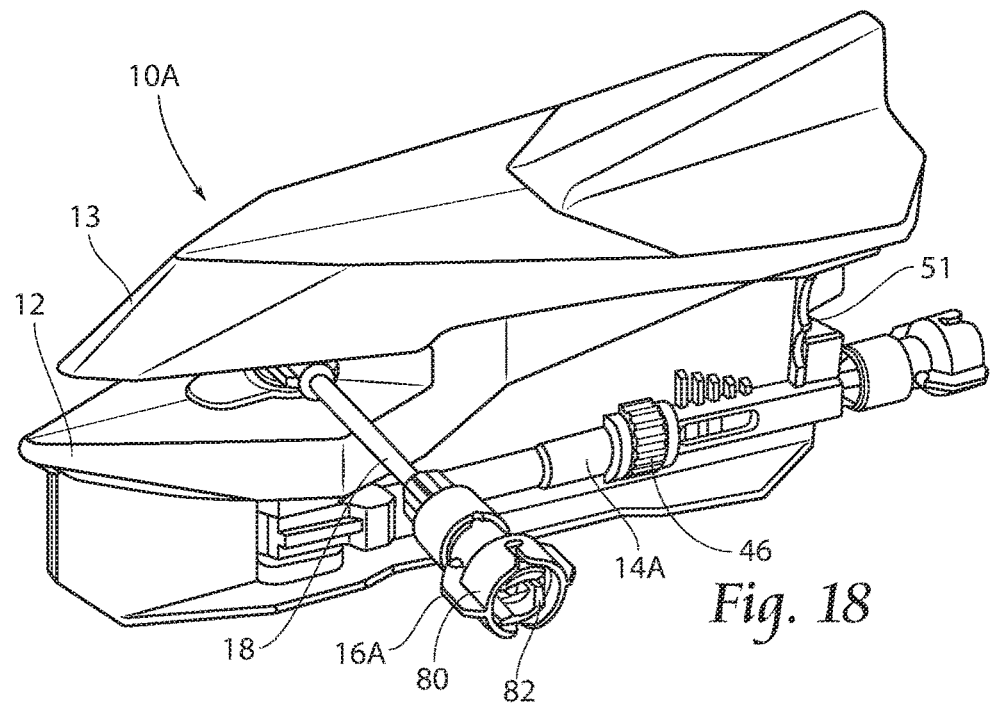
FIG. 18 is a perspective, partial cut away view of a planer board, similar to that of FIG. 1, but showing another embodiment having an alternative clip and trip pin arrangement.

With reference now to FIGS. 8-13 a method of using the board 10 may be seen. FIGS. 8-10 illustrate a method of use in which the device 10 is used on the starboard side 22A of a boat 24. As shown, a strike line clip 16 with attached fishing line 62 is mounted on the second end 28B of the trigger pin 26 (see FIG. 4) and the tow arm 18 is positioned on the left side 20B of the device 10 (see FIG. 2). When a fish 60 strikes, as is shown in FIG. 9, the strike line clip 16 is pulled in the direction of arrow A and, as discussed previously with regard to FIGS. 6 and 7, the movement pulls the tapered pin 30 from between the biasing rollers 48, opens the scissoring jaws 32, and allows the tow arm pivot rod 34 with attached tow arm 18 and tow line clip 16 to rotate in the direction of arrows C and D (see FIG. 6). When the tow arm 18 and Low line clip 16 are in the tripped position shown in FIG. 10, the board 10 moves in the direction of arrow D to a position behind the boat 24 to allow the user (not shown) to easily retrieve the board 10 and attached fish 60.

FIGS. 11-13 illustrate a method of use, similar to that shown in FIGS. 8-10, but showing use of the device 10 as used on the port side 22B of a boat 24. As shown, a strike line clip 16 with fishing line 62 is mounted on the second end 28B of the trigger pin 26 (see FIG. 4) and the tow arm 18 is positioned on the right side 20A of the device 10 (see FIG. 3). When a fish 60 strikes, as shown in FIG. 12, the strike line clip 16 is pulled in the direction of arrow A and, as discussed previously, the movement pulls the tapered pin 30 from between the rollers 48, opens the scissoring jaws 32, and allows the tow arm pivot rod 34 with attached tow arm 18 and tow line clip 16 to rotate in the direction of arrows D (see FIGS. 6 and 7). When the tow arm 18 and tow line clip 16 are in the tripped position shown in FIG. 13, the board 10 moves in the direction of arrow F to a position behind the boat 24 to allow the user (not shown) to easily retrieve the board 10 and attached fish 60.

With attention now to FIGS. 14-17, a clip 16 for use with the present device 10 may be viewed. As illustrated, a clip 16 may include a first clamping jaw 64A and a second clamping jaw 64B pivotable around a pivot point 66. FIGS. 14 and 15 illustrate a clip 16 in the open position wherein a tooth member 68 may be seen on a clamping jaw 64B. The tooth member 68 aids in retaining the line 62 in the clip 16 when the clip 16 is in use with the board 10. The tooth member 68 further helps to prevent slippage of the fishing line 62 during use. The clip member 16 is normally biased in the open position by a spring member 70. FIGS. 16 and 17 depict the clip 16 in the closed position with a fishing line 62 in place and ready for use with the described planer board 10. The first and second clamping jaws 64A, 64B are retained in the closed position by way of a latch mechanism 72 having a button 74 which is movable to bias against the spring 70. As shown, the button 74 may be moved to engage an abutment 76 on the first clamping jaw 64A to thereby compress the spring member 70 and retain the clip 16 in the closed position. Opening of the jaws 64A, 64B is effected by toggling the button 74 away from the abutment 76 to allow the spring member 70 to normally bias the jaws 64A, 64B to the open position. The clip 16 is further adapted for mating engagement with a tow arm 18 or the trigger pin 26, as may be desired. The clip 16 may include a reentrant bore 78 or other structure designed for mating friction fit with a corresponding component, such as a tow arm 18 or trigger pin 26.

FIGS. 18-24 illustrate another embodiment of a planer board 10A according to the present invention. As in the embodiment illustrated in FIGS. 1-7, the board 10A of these views includes a housing 12, a float member 13, an internal assembly 14A, and at least one line clip 16A. As is further seen in FIGS. 19 and 20, a line clip 16A is supported on a tow arm 18 and is adapted to be positioned on either the right or the left side 20A, 20B, respectively, of the board 10A (see for example FIGS. 2 and 3). This feature provides the same flexibility of use mentioned above with reference to FIGS. 1-17, and allows a single board 10A to be towed on either the starboard 22A or port side 22B of a boat 24 (see FIGS. 8-13), depending on the position of the tow arm 18, as has been discussed with reference to FIGS. 1-17.

Figure 19:
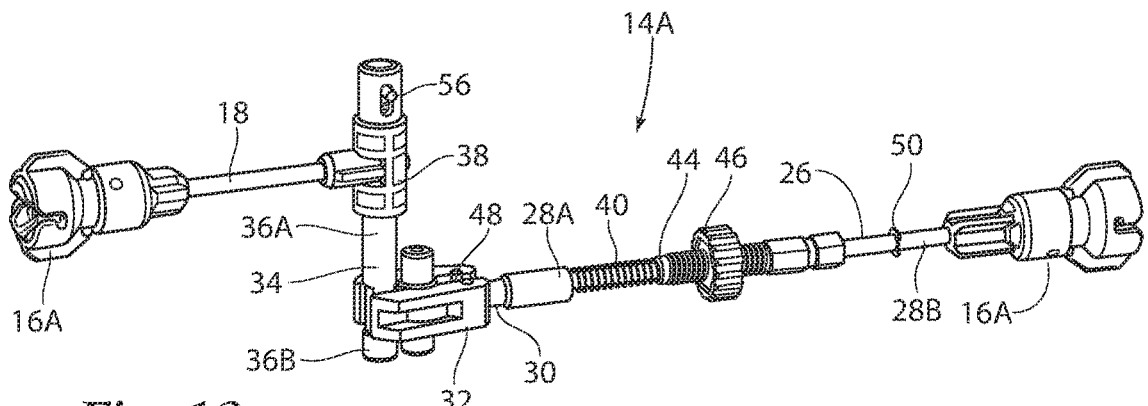
FIG. 19 is a perspective view of the internal assembly of the planer board illustrated in FIG. 18, with the housing removed and showing a tow arm in forward, tripped position.
Figure 19A:
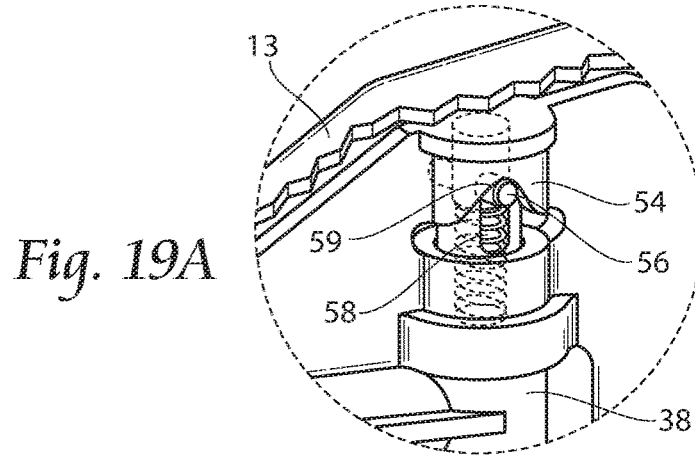
FIG. 19A is an enlarged, partially cut away view showing the trip pin illustrated in FIGS. 18 and 19 in tripped condition.

With attention to the views of FIGS. 19 and 19A, the internal assembly 14A and attached clips 16A may be seen. As shown, and similar to the previously described embodiment, the internal assembly 14A includes a trigger pin 26 having a pin first end 28A and a pin second end 28B, a tapered pin 30, and scissoring jaws 32. A tow arm pivot rod 34 having a first rod end 36A and a second rod end 36B is supported at its second end 36B by scissoring jaws 32. A tow arm 18 is pivotally attached to the first rod end 36A of the tow arm pivot rod 34 by way of a tow arm collar 38. FIG. 19 illustrates the assembly 14A in tripped position. In tow position, and as seen in FIG. 4, the scissoring jaws 32 clamp the second end 36B of the tow arm pivot rod 34 in tow position and prevent it, the tow arm 18, and the attached tow line clip 16A from rotation. As in the previous embodiment, the first end 28A of the trigger pin 26 supports a tensioning spring 40 therearound. A first end 42A of the tensioning spring 40 abuts the tapered pin 30, and a second end 42B abuts a threaded sleeve 44. The threaded sleeve 44 provides variable set tension on the tensioning spring 40 by way of adjustment of a spring tensioning thumb wheel 46. Tensioning spring 40 biases the tapered pin 30 between rollers 48 set in scissoring jaws 32. When the tapered pin 30 is biased against the rollers 48, as is shown in FIGS. 4 and 5, the jaws 32 are firmly clamped on the tow arm pivot rod 34, thereby preventing rotation thereof and holding the tow arm pivot rod 34 and tow arm 18 in a tow position. As in the previous embodiment, a retaining ring 50 may be provided on the second end 28B of the trigger pin 26 to limit travel of the trigger pin 26 in the direction of arrow A (see FIG. 6) as the trigger pin 26 exits the housing 12. When the ring 50 contacts the housing 12 it prevents the trigger pin 26 from further rearward displacement. It may be desirable to limit travel of the trigger pin 26 to thereby reduce excessive travel and over-compression of the trigger pin tensioning spring 40. As described above with reference to FIGS. 1A and 1B, the embodiment of these views may include a locking mechanism 51 to further prevent travel of the trigger pin 26, if desired. In use, the locking mechanism 51 prevents rotation of the tow arm pivot rod 34 during a fish strike or other rearward movement of the strike line clip 16A. The locking mechanism 51 may be utilized when for example, a user desires to use the board 10A in a conventional, non-trip manner, or if the user wishes to reduce false strikes while dragging a bait in snag prone areas (not shown).

As may be further viewed in FIGS. 19 and 19A, manipulation of the tow arm 18 from one or the other side 20A, 20B of the device 10A may be accomplished by way of a spring loaded button 52A. Unlike the button 52 of previous views, the button 52A illustrated in FIGS. 19 and 19A, is fully retained within the main housing 12. As illustrated in FIGS. 19 and 19A, a spring loaded button 52A is retained in a button housing 54 and within the main housing 12. The button 52A includes a transverse pin member 56 which is adapted for engagement in a pin slot 58 in the button housing 54. When positioning of the tow arm 18 to one or the other side 20A, 20B of the board 10 is desired, the user simply manually rotates the tow arm 18 to the desired side 20A, 20B of the board 10A. As the tow arm 18 is rotated, the pin member 56 is forced out of the detent 59 in the pin slot 58, down the sides of the pin slot 58 and lowered from the pin slot 58 until the tow arm 18 is positioned as desired. The pin 56 is engaged in the pin slot detent 59 after a fish strike, as discussed above with reference to FIGS. 8-13.

Figure 20:
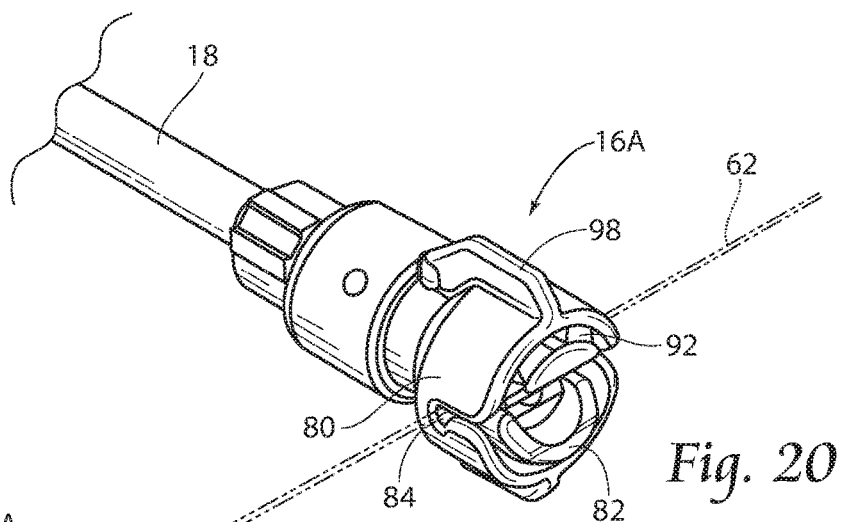
FIG. 20 is a perspective view of the line clip illustrated in FIGS. 18 and 19, and showing the clip in the open position with a line in phantom.
Figure 21:
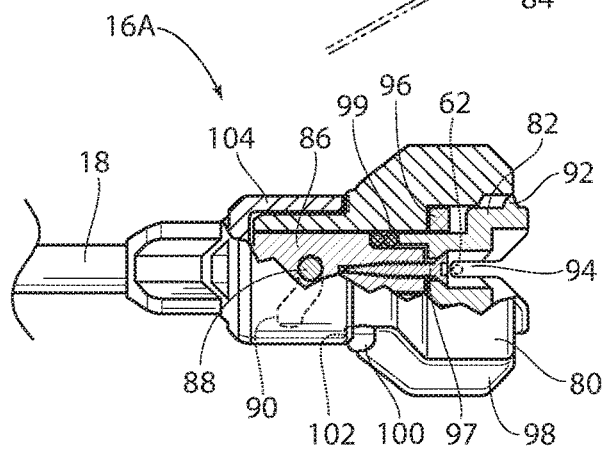
FIG. 21 is a partially cut away side view of the line clip illustrated in FIG. 20.

With attention now to FIGS. 20-24, another clip 16A for use with the device 10, 10A may be viewed. As illustrated, the twist clip 16A may include a rotating clamp head 80 and a stationary clamp head 82 with the rotating clamp head 80 rotatable around the stationary clamp head 82. As seen, the rotating clamp head 80 may include at least one, and preferably two, spaced apart slots 84, with the slots 84 being located across from one another along the rotating clamp head 80 circumference, and being sized and shaped to receive a fishing line 62. With particular reference to FIG. 21, it may be seen that the twist clip 16A may include a core pin 86, having a cam follower 88. The cam follower 88 is arranged to ride in a corresponding cam profile 90 on the rotating clamp head 80.

With regard to the stationary clamp head 82, and as seen in FIGS. 20 and 21, the stationary clamp head 82 may preferably include protrusions 92 to help retain a line 62 when the twist clip 16A is in the closed position, as will be discussed. Moreover, the stationary clamp head 82 preferably includes at least one slot 94 that runs across a diameter d of the stationary clamp head 82. As seen particularly in FIGS. 22 and 24, the slot 94 is bisected by a clearance hole 95 for an adjustment mechanism, such as the adjustment screw 97 shown. The adjustment screw 97 functions to adjust the clamping force of the clip 16A and further fastens stationary clamp head 82 to the core pin 86. While a screw 97 is illustrated as a preferred adjustment mechanism, it is to be understood that other adjustment mechanisms may be envisioned without departing from the invention. The stationary clamp head 82 is splined to the core pin 86 to prevent rotation between the stationary clamp head 82 and the core pin 86 while allowing for axial slippage between the stationary clamp head 82 and the core pin 86. Axial slippage allows the clamping force of the clip 16A to be adjusted by turning the screw 97. As seen, the core pin 86 may be provided with a cushioned backing 99 to absorb any differential in clip 16A length due to the mentioned axial adjustment. The cushioned backing 99 is provided to interface with the stationary clamp head 82.

Figure 22:
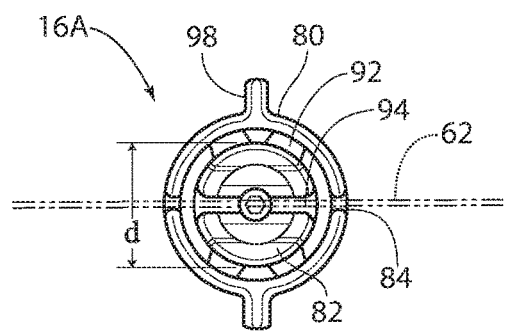
FIG. 22 is an end view of the line clip illustrated in FIGS. 20 and 21 and showing the clip in the open position.

FIGS. 20-22 illustrate the twist clip 16A in the open position wherein the slots 84 of the rotating clamp head 80 are aligned with the slot 94 of the stationary clamp head 82, and a line 62 is positioned in the slots 84, 94.

Figure 23:
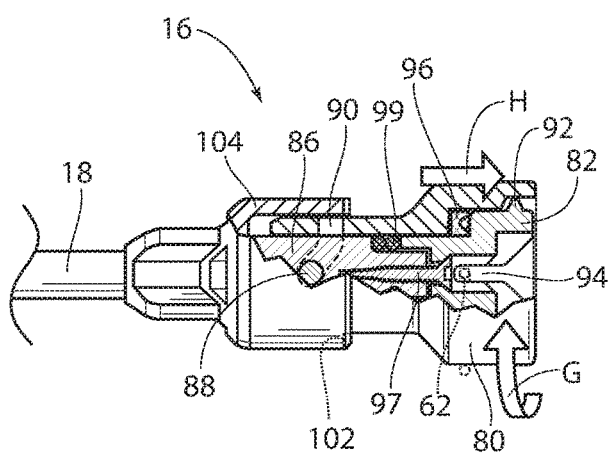
FIG. 23 is a partially cut away side view, similar to that of FIG. 21, but showing rotation of the clip and capture of a line.
Figure 24:
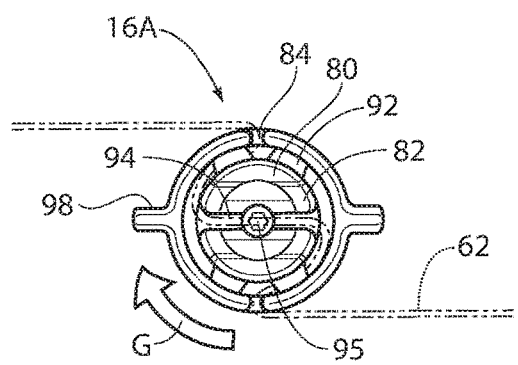
FIG. 24 is an end view, similar to that of FIG. 22, but showing the clip rotated to the closed position of FIG. 23.

With attention to FIGS. 23 and 24, the twist clip 16A is illustrated with the rotating clamp head 80 rotated approximately 90 degrees in the direction of arrow G, such that the line 62 is captured and threaded around the protrusions 92 of the stationary clamp head 82. As is shown, the line 62 is wrapped around the stationary clamp head 82 in an approximate "S" shape, while the action of the cam follower 88 in the cam profile 90 urges the rotating clamp head 80 in the direction of arrow H and against a friction pad 96. The friction pad 96 aids in retaining the line 62 in the twist clip 16A when the twist clip 16A is in use with the board 10, 10A. The friction pad 96 further helps to prevent slippage of the fishing line 62 during use. The rotating clamp head 80 of the twist clip member 16A may be further provided with laterally extending flanges 98 to assist the user during rotation and use. As is seen in FIG. 21, at least one of the flanges 98 may include an excised portion 100 arranged to engage a corresponding detent 102 in the connector 104. A user may engage the excised portion 100 in a corresponding detent 102 when it is desired to retain the twist clip member 16A in an open condition, as is shown in FIGS. 20-22. FIGS. 23 and 24 depict the twist clip 16A in the closed position with a fishing line 62 in place and ready for use with the described planer board 10, 10A. The rotating clamp head 80 is retained in the closed position by way of frictional contact with the friction pad 96. Release of the heads 80, 82 is effected by manual rotation of the rotating clamp head 80 in an opposite direction to thereby realign the respective slots 84, 94 to the open position. The twist clip 16A is further adapted for mating engagement with a tow arm 18 or the trigger pin 26, as may be desired. For example, the cam follower 88 on the core pin 86 may further serve to retain the core pin 86 in a connector 104 or other like structure which is adapted to fit multiple applications, such as a tow arm 18 or other structures (not shown).

Figure 25:
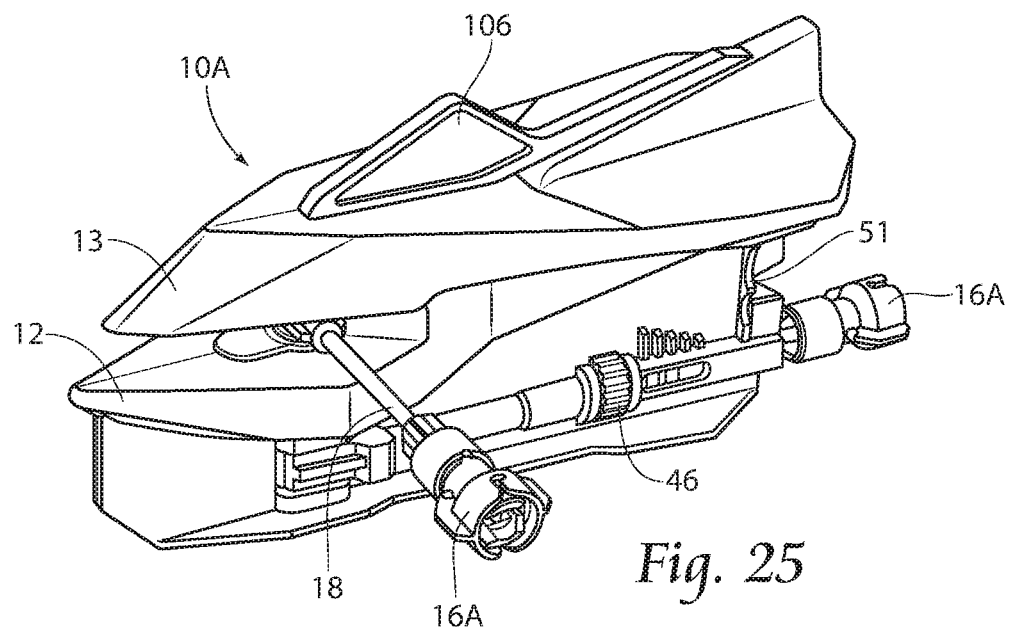
FIG. 25 is a perspective, partial cut away view of a planer board, similar to that of FIG. 18, but showing the planer board having an indicator device in stowed position.
Figure 26:
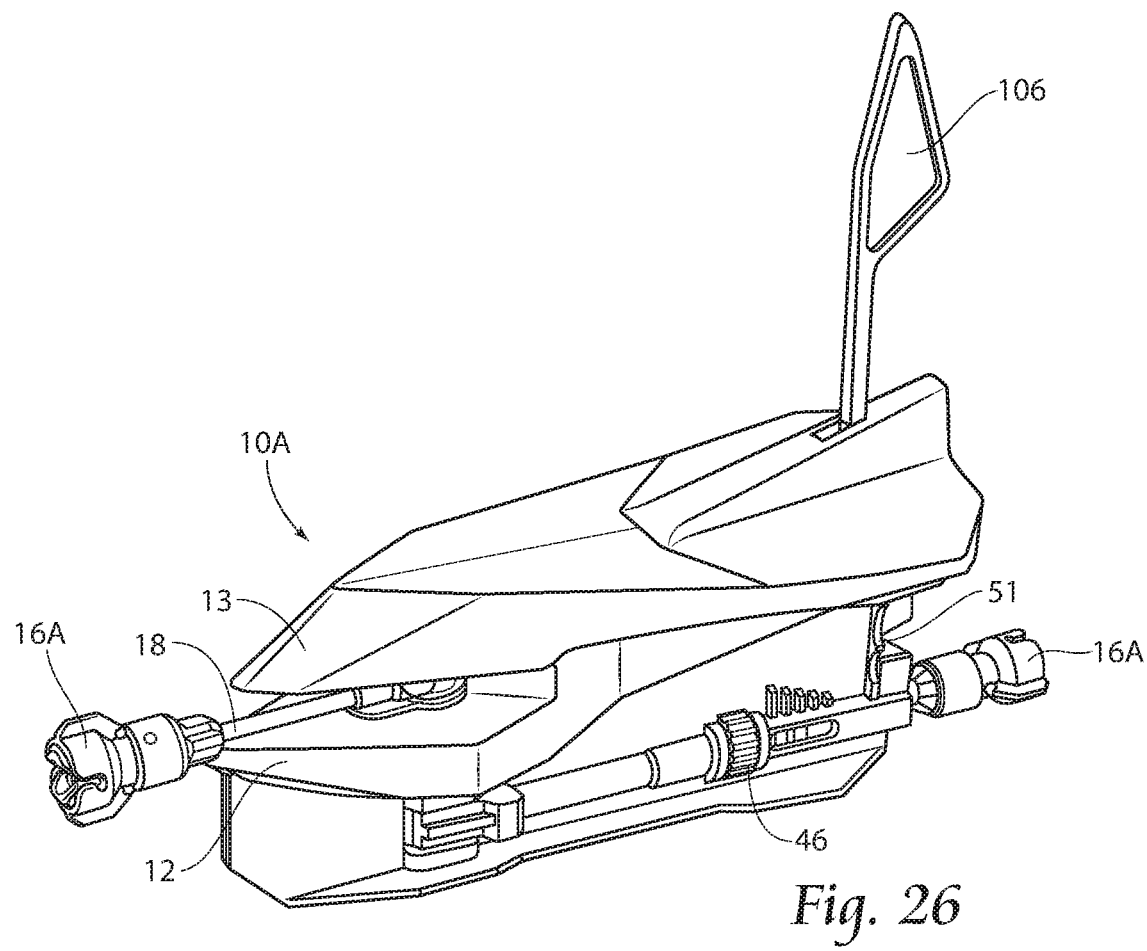
FIG. 26 is a view, similar to that of FIG. 25 but showing the indicator device in deployed position.

With attention now to FIGS. 25 and 26, it may be seen that the planer board 10A may be further provided with an indicator device, such as the flag 106 shown. The indicator device serves to alert the fisher (not shown) the planer board 10A location. FIG. 25 shows the flag 106 in the stowed position with the tow arm 18 in towing position and the planer board 10A ready for use. The flag 106 is preferably manually operated and may be deployed by the user to increase the visibility of the board 10, 10A to the user and other boaters (not shown).

Although a flag 106 is illustrated in these views, it is to be understood that other indicator devices may be employed without departing from the invention, including but not limited to upright members, lights, or the like, that are capable of increasing the visibility of the device 10, 10A.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A fishing planer board including:
   a housing having a centerline, said housing including an assembly arranged on said centerline;
   wherein said assembly comprises:
   a trigger pin having a trigger pin first end and a trigger pin second end, said trigger pin having a longitudinal axis arranged on said centerline and configured to slide, with respect to said housing, along said longitudinal axis;
   a first line clip coupled to a pivot rod configured to rotate about a pivot rod axis orthogonal to said longitudinal axis of said trigger pin;
   a second line clip coupled to said trigger pin second end and configured to move, together with said trigger pin, along said longitudinal axis of said trigger pin; and
   a tow arm arranged to couple said first line clip to said pivot rod, said tow arm being further arranged for positioning on either side of said fishing planer board about said pivot rod axis.

2. The fishing planer board of claim 1 wherein said pivot rod comprises a first rod end and a second rod end, said first rod end coupled to said tow arm; and
   wherein said assembly further includes:
   a longitudinal pin including a first end and a second end, said first end of said longitudinal pin having a taper;
   scissoring jaws aligned with said longitudinal axis of said trigger pin and configured to support said second rod end of said pivot rod;
   a tensioning spring supported on said trigger pin first end.

3. The fishing planer board of claim 2 further including a variable tension mechanism.

4. The fishing planer board of claim 3 wherein said variable tension mechanism includes:
   a threaded sleeve;
   wherein said tensioning spring includes a first end arranged to abut said second end of said longitudinal pin and a second end arranged to abut said threaded sleeve; and
   a tensioning wheel.

5. A fishing planer board including:
   a housing having a centerline, said housing including an assembly arranged on said centerline;
   wherein said assembly comprises:
   a trigger pin having a trigger pin first end and a trigger pin second end, said trigger pin having a longitudinal axis arranged on said centerline and configured to slide along said longitudinal axis;
   a tow arm pivot rod configured to rotate about a pivot rod axis;
   a pair of line clips;

a tow arm arranged to couple one line clip of said pair of line clips to said tow arm pivot rod;

a longitudinal pin including a first end and a second end, said first end of said longitudinal pin having a taper;

scissoring jaws;

a tensioning spring supported on said trigger pin first end; and wherein said tow arm pivot rod has a first rod end and a second rod end, said second rod end being supported by said scissoring jaws, and wherein said tow arm is attached to said first rod end of said tow arm pivot rod; and wherein another line clip of the pair of line clips is coupled to said trigger pin second end and is configured to move, together with said trigger pin, along said longitudinal axis of said trigger pin.

\* \* \* \* \*

UNITED STATES PATENT AND TRADEMARK OFFICE
CERTIFICATE OF CORRECTION

PATENT NO. : 10,617,105 B2
APPLICATION NO. : 15/365521
DATED : April 14, 2020
INVENTOR(S) : Wakefield Page 1 of 1

It is certified that error appears in the above-identified patent and that said Letters Patent is hereby corrected as shown below:

In the Specification

Column 4, Line 53, delete "and Low line" and substitute therefore -- and tow line --.

Signed and Sealed this
Second Day of June, 2020

Andrei Iancu
*Director of the United States Patent and Trademark Office*